Nov. 17, 1936.  F. HURUM  2,061,157
TWO-CYCLE MOTOR
Filed Aug. 18, 1934   2 Sheets-Sheet 1

Inventor:
F. Hurum
By E. F. Wenderoth
Atty

Nov. 17, 1936.   F. HURUM   2,061,157
TWO-CYCLE MOTOR
Filed Aug. 18, 1934   2 Sheets-Sheet 2

Patented Nov. 17, 1936

2,061,157

UNITED STATES PATENT OFFICE 2,061,157

TWO-CYCLE MOTOR

Fredrik Hurum, Barcelona, Spain

Application August 18, 1934, Serial No. 740,505
In Norway August 18, 1933

5 Claims. (Cl. 123—65)

The present invention relates to reciprocating two-cycle motors with two-way scavenging air, and the invention consists mainly in the fact that the scavenging air is introduced through a valve into a pocket located in the cylinder head, the scavenging air then being directed in a jet against the upper side of the piston, the scavenging air then expelling the combustion gases by pushing them upwardly before it and out through one or more exhaust valves, likewise placed in the cylinder head.

The two-cycle motor in accordance with my invention can be so designed that the fuel-valve or fuel injector communicates with the pocket in which the intake valve is located, whereby the advantage is obtained that the fuel-valve directs the jet of fuel against the opening which is formed between the pocket and the motor cylinder.

Figure 1:
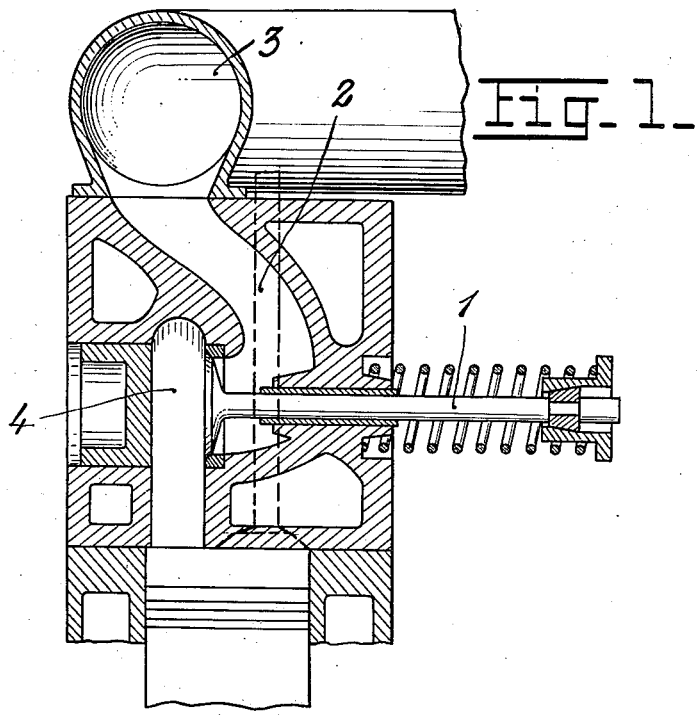
Figure 2:
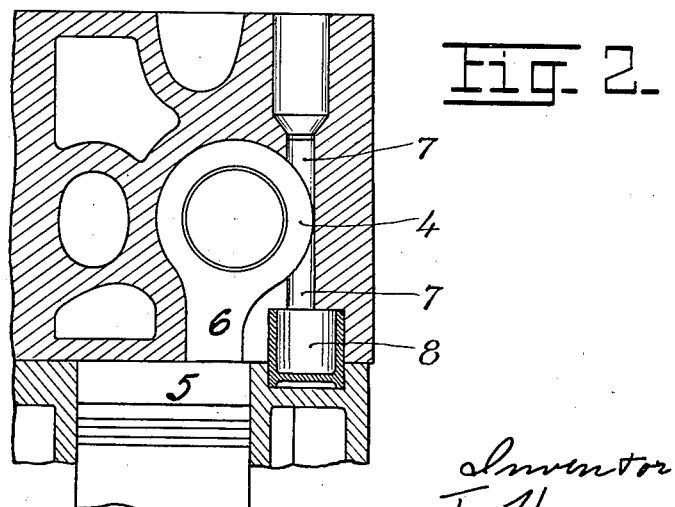
Figure 3:
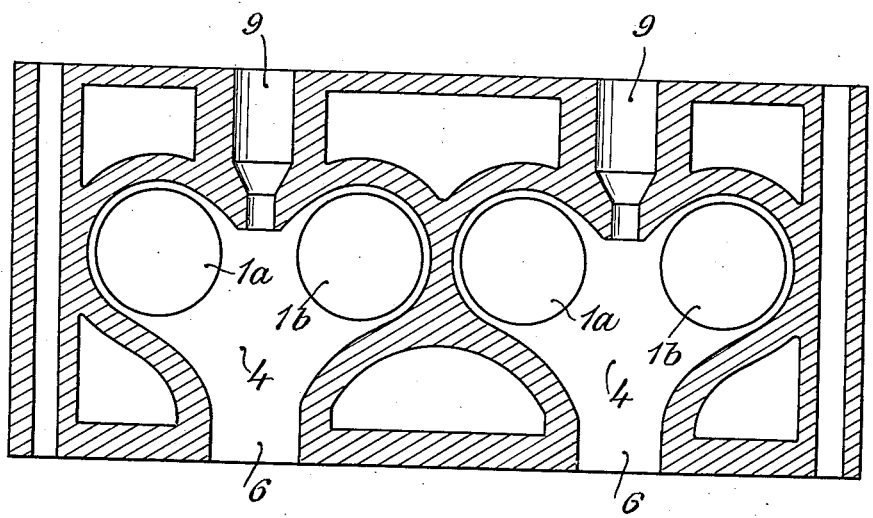
Figure 4:
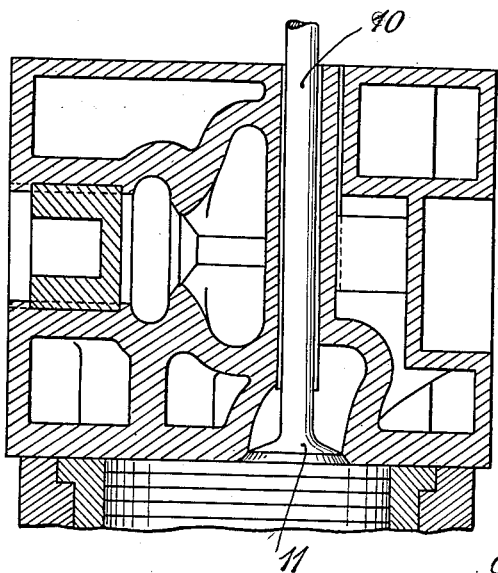

On the drawings two different embodiments of the invention are diagrammatically illustrated, Fig. 1 showing a section through the axis of the intake valve in the cylinder head of the motor, while Fig. 2 shows a section at right angles to the section shown on Fig. 1; Fig. 3 and Fig. 4 show two sections, at right angles to each other through a cylinder head of a different embodiment.

The intake valve 1 governs the communication between the inlet passage 2 from the pipe 3, conducting the scavenging air, and the pocket 4 in the cylinder head. The pocket 4 has, as is shown on the drawings, a flat circular form, which is concentric or approximately concentric with the axis of the intake valve, and which communicates with the cylinder 5 by a vertical orifice 6, which directs the scavenging air against the surface of the piston in such manner that the scavenging air drives the combustion gases upwards from the top of the piston and out through the cylinder head, in which an exhaust valve is placed as shown in dotted outline in Fig. 1.

The conduit 7 in which the fuel-valve is placed runs approximately tangential to the pocket 4, with which it communicates, but continues beyond said pocket and down to an antechamber 8, which is placed in the cylinder head in such a manner that it retains a very high temperature, causing the injected fuel to ignite immediately when it approaches the walls of the antechamber, causing a very strong flame to jump back into the valve pocket and creating a turbulence in the pocket 4, carrying with it the remaining part of the fuel jet, and in this manner creating a good mixture of the air and fuel in the pocket 4.

Figures 3 and 4 show diagrammatically a form of the invention in which two intake valves 1a and 1b are placed in each of the flat-shaped pockets 4. Fig. 3 shows a vertical section through the cylinder head of a two-cycle motor, and it will be seen from the drawing that the fuel-valve or fuel injector 9 is placed so that the fuel jet passes downwardly into the orifice 6 interconnects the cylinder and the said flat-shaped pocket, and accordingly the fuel is well mixed with the intake air when the latter is forced into the pocket towards the end of the compression stroke.

Fig. 4 shows a section at right angles to Fig. 3, and it will be seen that the exhaust valve 10 has its axis parallel with the cylinder axis and that the surface of the valve is flush with the bottom of the cylinder head.

I claim:

1. In a two-cycle internal combustion engine with two-way scavenging, an exhaust passage, a cylinder head formed with a flat internal air chamber independent of said exhaust passage, said exhaust passage connecting with said cylinder head, and a lateral air intake valve and a fuel valve in said chamber, said chamber communicating with the cylinder through a restricted opening of such a shape as to direct scavenging air from said chamber into the cylinder as a compact jet, directed towards the piston, and said fuel valve being so arranged as to direct a substantial part of the fuel jet through said chamber towards said opening.

2. In a two-cycle internal combustion engine with two-way scavenging, an exhaust passage, a cylinder head formed with a flat internal air chamber independent of said exhaust passage, said exhaust passage connecting with said cylinder head, and a lateral air intake valve in said chamber, said chamber communicating with the cylinder through a restricted opening of such a shape as to direct scavenging air from said chamber into the cylinder as a compact jet, directed towards the piston, and said air intake valve being arranged with its axis at a substantially right angle to the direction of flow of scavenging air from the intake valve through the flat internal chamber of the cylinder.

3. In a two-cycle internal combustion engine with two-way scavenging, an exhaust passage, a cylinder head formed with a flat internal air chamber independent of said exhaust passage, said exhaust passage connecting with said cylinder head, and, a lateral air intake valve and a fuel valve in said chamber, said chamber communicating with the cylinder through a restricted opening of such a shape as to direct scavenging air from said chamber into the cylinder as a compact jet, directed towards the piston, and said fuel valve being so arranged as to cause injection of fuel into said air chamber in a plane substantially at right angles to the axis of said intake valve.

4. In a two-cycle internal combustion engine with two-way scavenging, an exhaust passage, a cylinder head formed with a flat internal air chamber independent of said exhaust passage, said exhaust passage connecting with said cylinder head, and a lateral air intake valve in said chamber, said chamber communicating with the cylinder through a restricted opening of such a shape as to direct scavenging air from said chamber into the cylinder as a compact jet directed towards the piston, and said air intake valve being arranged with its axis at a substantially right angle to the direction of said jet of scavenging air and to the plane of injection of fuel from said fuel valve.

5. In a two-cycle internal combustion engine with two-way scavenging, an exhaust channel, a cylinder head in which said exhaust channel is formed, said cylinder head having a flat internal air chamber formed therein independent of said exhaust channel, an exhaust valve arranged between the cylinder space and said exhaust channel, and a lateral air intake valve in said chamber, said chamber communicating with the cylinder through a restricted opening of such a shape as to direct scavenging air from said chamber into the cylinder as a compact jet, directed towards the piston.

FREDRIK HURUM.